Patented Oct. 6, 1953

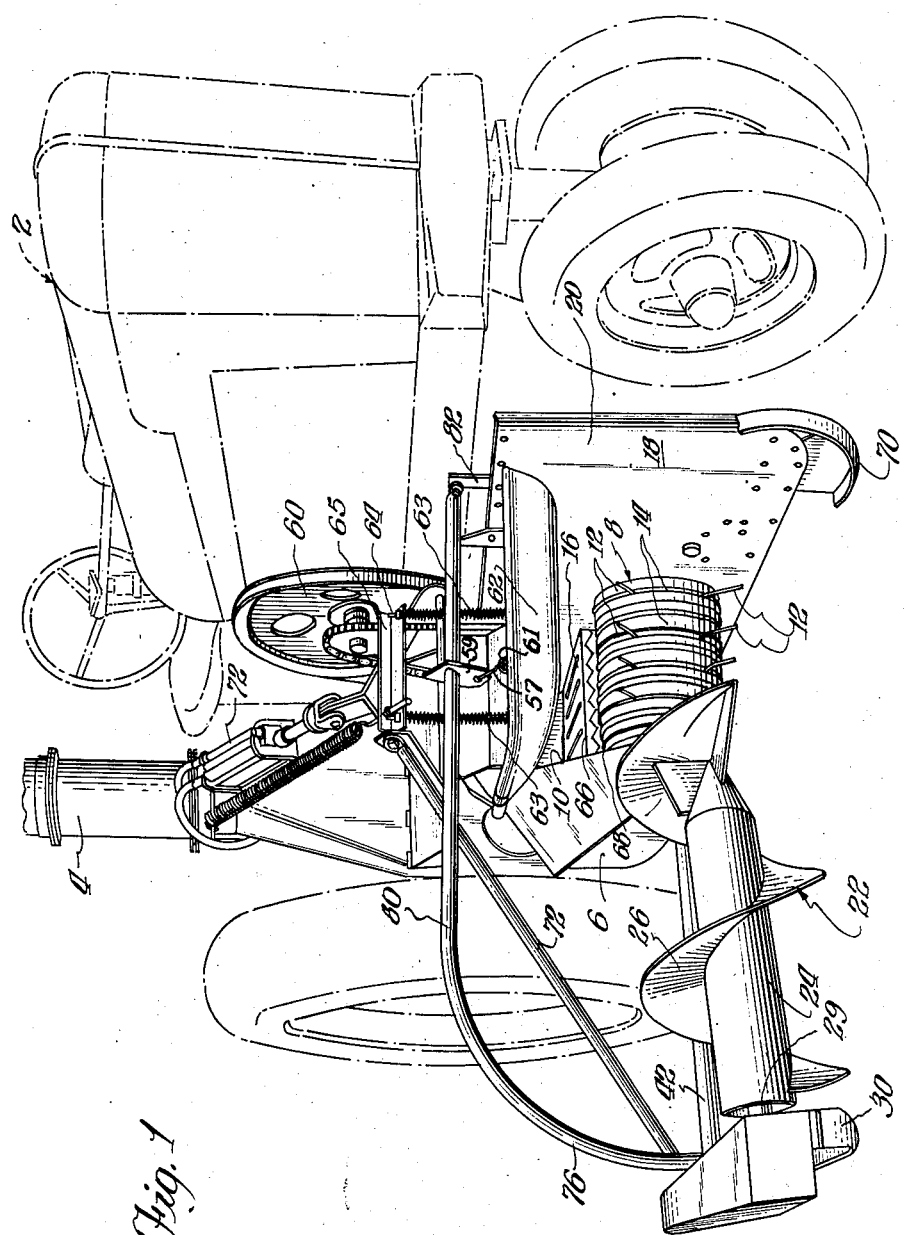

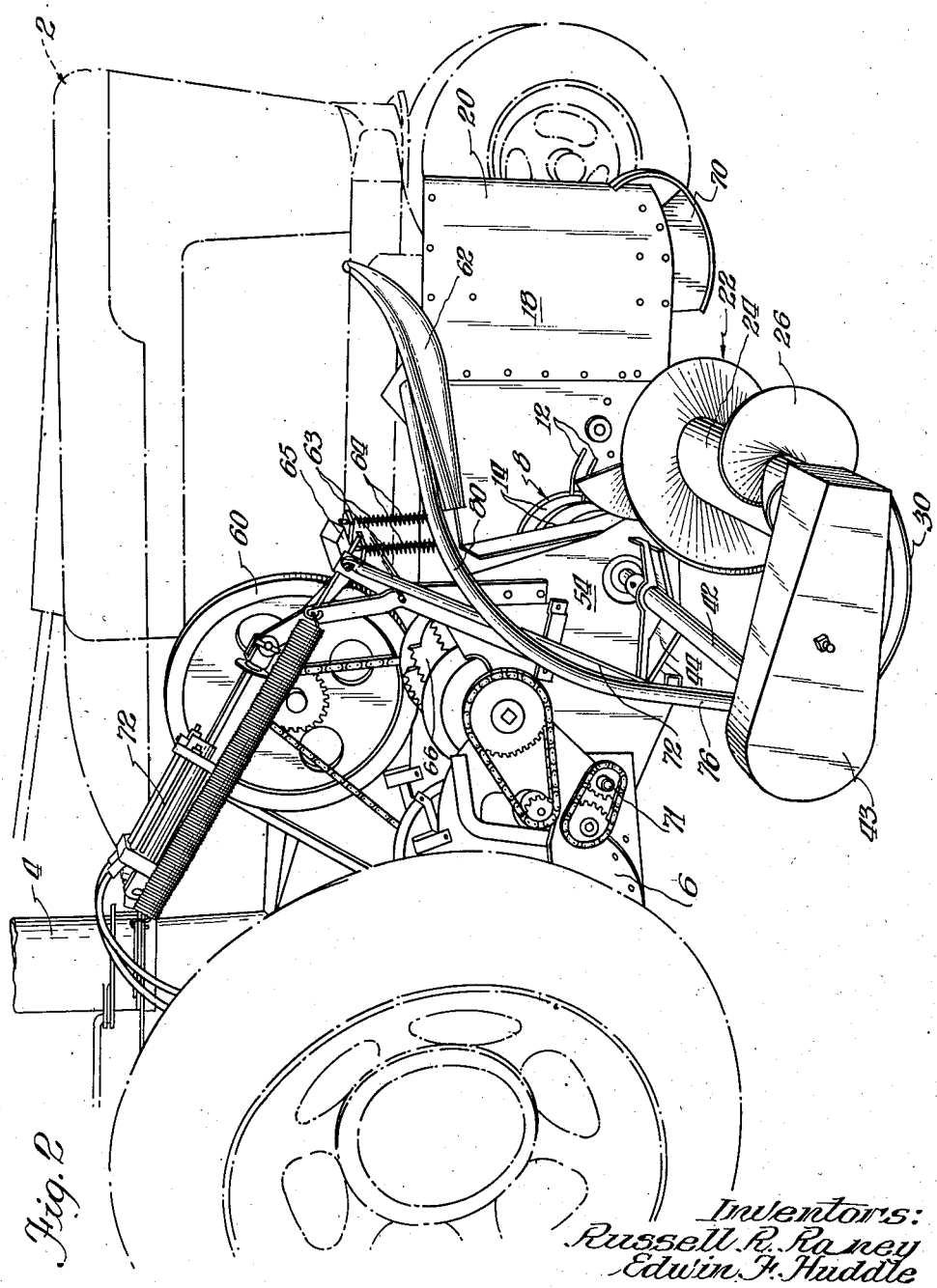

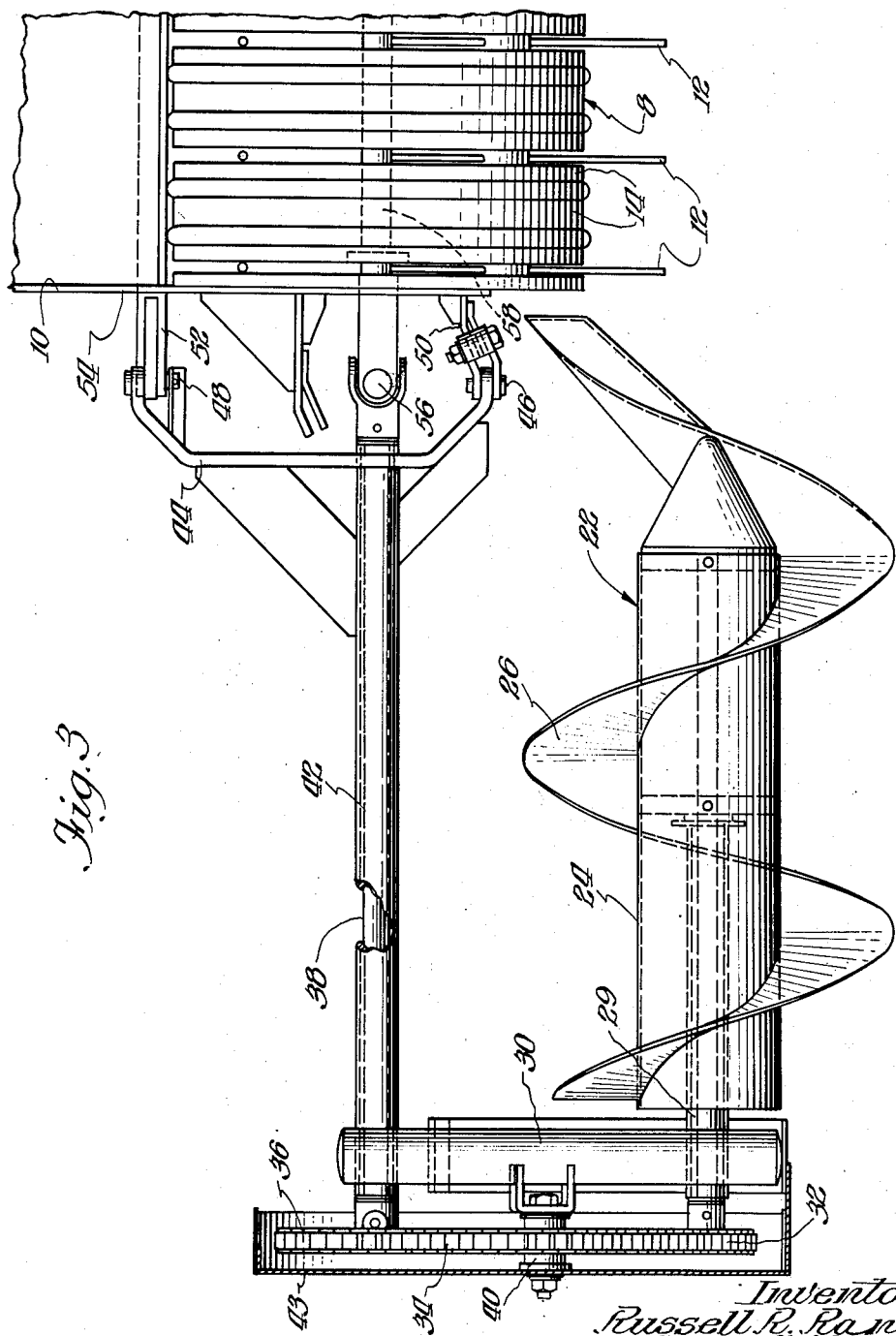

2,654,209

UNITED STATES PATENT OFFICE 2,654,209

HARVESTER PICKUP

Russell R. Raney, Western Springs, and Edwin F. Huddle, Elmwood Park, Ill., assignors to International Harvester Company, a corporation of New Jersey Application January 9, 1951, Serial No. 205,102

9 Claims. (Cl. 56—364)

1

This invention relates to harvesters and, more specifically to a forage harvester incorporating a novel pick-up and crop-gathering arrangement.

A general object of the invention is to provide a novel arrangement of the type which will gather cut forage, such as hay, directly from the ground and which is movable and preferably powered by a tractor to which it is attached.

A different object of the invention is to provide a simple lightweight pick-up attachment for such forage harvester and which is simple and economical to manufacture and readily attachable and detachable and in position where it is readily available for repair.

A more specific object of the invention is to provide a gatherer for windrowed forage arranged to shift the forage laterally on the ground to feed it to a pick-up which feeds into a harvester delivering to a suitable conveyance such as a farm wagon by means of which the forage is transported to a place of storage.

The invention specifically contemplates the provision of an open ended auger for conveying the cut forage from its windrowed position to the harvesting machine, the auger being arranged to roll along the ground. The auger in this location has been found to serve efficiently and to eliminate bulky, expensive structures such as scoops or platforms in conjunction with conveyors.

A further object is to devise an efficient and simple gathering means which will pick up a wide swath of cut forage and which is exceptionally free from clogging and which provides a rugged construction having long life in service.

The invention provides in combination with the conventional pick-up, a primary pick-up or gatherer in the form of an auger which extends laterally from the conventional pick-up and feeds thereto, the auger being supported at its end remote from the conventional pick-up and being arranged to operate directly over the ground.

These and other objects of the invention will become more apparent from the specification and the drawings wherein:

Fig. 1 is a perspective view taken from the right front end of the harvester unit with the novel pick-up connected thereto.

Fig. 2 is a perspective view taken from the left of Fig. 1, and

Fig. 3 is an enlarged top plan view, partly in horizontal section, of the pick-up unit disassociated from the harvesting machine,

2

Describing the invention in detail, the harvesting apparatus is mounted on a conventional tractor generally designated 2, the harvester being provided with the usual spout or chute 4 at its discharge end which is arranged to convey the harvested crop to a trailing wagon such as is well known in the art. The spout 4 is part of the harvester housing or support structure and is connected to a cutter head portion 6 which cuts the material into suitable length. The cutter head portion which may be of any conventional design is arranged to receive from a conventional pick-up generally indicated 8, and disposed at the forward end of a delivery trough 10 which together with the portion 6 forms a crop-receiving structure, chamber or passage and with the tractor provides a field traversing support. The conventional rear-delivery pick-up or charging means may be of the type shown in C. R. Raney et al. Patent 1,815,327 or B. M. Hyman Patent 2,256,829 and may comprise a plurality of tines 12, 12 arranged to move the cut hay over stripper bars 14, 14 into a throat or inlet 16 at the forward end of the trough 10. The trough 10 may be projected at its inboard side to provide a sheet metal panel 18 extending forwardly of the pick-up 8, the guide panel 18 being curved inboardly as at 20 to provide for a broad sweep.

The guide panel 18 is aligned transversely thereof with a primary conveyor or gatherer in the form of an auger parallel with pick-up 8 outboardly thereof. From a consideration of the drawings it will be readily apparent that the auger 22, which rotates with pick-up 8 in a counter-clockwise direction as seen in Figure 2 to sweep the crop in front of itself, is arranged in series with the pick-up and that the discharge end of the auger 22, which is the inboard open end of the auger, is disposed adjacent to the outboard end of the pick-up 8.

The support for the auger comprises a sleeve 24 upon which are wound and attached dextrorsal helical fins or flights 26. The sleeve 24 is connected to a rotatable driving shaft 28 which is journaled in a bearing sleeve 29 mounted on a runner or a ground-engaging shoe 30. The outboard end of the shaft 28 extends from sleeve 29 outboardly of runner 30 and is connected to a sprocket 32 which is driven by a chain 34 having a driving connection with a sprocket 26 mounted on the outboard end of a driving shaft 38. The chain rides over a tightening pulley 40 which is pivoted on a bolt 41 connected to the runner 30 and to a casing 43 enclosing the gears 32, 36 and chain 34. The driving shaft 38 is journaled adjacent to its outboard end in a bearing sleeve 42 connected to runner 30 at its outboard end. The shaft 38 and sleeve 42 extend generally parallel to the shaft 28 and are disposed rearwardly of the auger 22 and sleeve 42 has its inboard end connected to a hinge bracket 44 which is pivoted at 46 and 48, respectively, to lugs 50 and 52, mounted on the outboard side of an outboard panel 54 of the trough 10. The shaft 38 has a universal connection at 56 to the outboard extremity of a drive shaft 58 of the pick-up 8, the shaft 58 being driven through suitable linkage from the power take-off pulley 60 of the tractor 2. Inasmuch as this power transmitting linkage is not per se part of the invention the same will not be described in detail. It will be noted that the axes of pivot at 46 and 48 extend longitudinally of the tractor and that this arrangement permits rotating the primary gathering unit, the auger to raise it off the ground to transport position.

Forwardly of the trough 10 the pick-up arrangement comprises a floating top tamper plate or panel 62 which extends along the upper edge of the guide panel 18 outboardly thereof, the tamper 62 being slightly greater in width than the pick-up 8 and extending over the inboard end of the auger. The tamper plate is connected adjacent to its rear or inner end to a pair of bolts 64, 64, said bolts extending at their upper ends through brackets on an angle iron 65 which in the present instance is formed as part of the bracing structure of the harvester housing. It will be seen that the lower ends of the bolts 64, 64 are connected to the plate 62 and that springs 63 are arranged to bias the inner end of the plate to a position determined by the lengths of the bolts, the springs being sleeved over the respective bolts and being compressed between the bottom side of the angle iron brackets and the top side of the plate 62. The forward end of the tamper plate 62 is movably supported by a loop link 57 extended through a bracket 59 on brace 80 and an eye 61 on the forward edge of plate 62 as best seen in Figure 1.

In the present instance, the tamper plate and the panel 18 form a mouth which leads to the pick-up 8. It will be seen that as the material accumulates in uneven bunches over the pick-up 8 the tamper plate, which forms the roof of the mouth, will move up and down to accommodate the load and at the same time hold the material from flowing out from its intended path of travel to the roll 66 in the trough 10 and on the conveyor 68 to the feeding mechanism for the cutter head.

It will be seen that in addition to the support by the runner 32, and gatherer structure the pick-up attachment are also supported at the inboard end by a shoe or runner 70 which is connected to the lower edge of the panel 18 adjacent to the forward end thereof. It will also be seen that the inwardly turned portion 20 at the forward edge of the panel prevents the material from fouling the wheels.

In the shown construction the entire harvesting mechanism may be lifted bodily upwardly to transport position by pivoting the forward section on a pivotal joint at 71 by means of a hydraulic cylinder 72' which is motivated by the usual hydraulic means of the tractor 2.

Supplementary bracing may be provided in order to stiffen the parts and insure that the auger is maintained in proper attach position preferably perpendicular to the line of draft. One of these braces may comprise a diagonally extending compression bar 72 which may be connected at its forward outboard end to the rear end of the runner 30. The bar 72 may have its inner upper end connected at a point rearwardly of the runner 32 to the outboard side of one of the bracing members of the harvester apparatus such as angle iron 65. The lower forward extremity of the rearwardly angle brace member 72 may be connected to the lower end of a forward brace or tension member 74, said forward brace member having an outboard portion 76 which may extend from the juncture of its lower end as at 78 upwardly and curve inboardly into a generally horizontal forwardly angled portion 80, said forwardly angled portion extending a substantial distance above the auger 22 and above the tamper plate 62 and having its forward inboard end connected by a suitable bracket 82 to the upper part of the guide panel 18 adjacent to the forward end thereof. It will be noted that these braces 72 and 74 are readily removable and may be preferably formed and arranged to provide a hinged construction which will operate with the hinge connection at 46 and 48 so that the auger may be tilted upwardly when it meets ground obstructions.

It will be readily appreciated that the invention described provides a novel, simple and effective pick-up arrangement for a forage harvester and that the construction is of simple and rugged form such as will meet all operating conditions. In actual practice, the auger, as arranged, has been found highly effective and clean sweeps the cut hay on the ground to the pick-up. The auger is moved directly into the crop and merely gently shifts it transilatorily toward its discharge end without tumbling and enveloping the crop with dirt, stones or clods and without kicking up and fluffing the crop so that the crop is presented to the pick-up 8 compacted as it lay on the field and not in a loose fluffy bunch of greatly expanded volume which materially reduces the efficiency of the pick-up and necessitates a substantially large crop-receiver.

The flighting 26 of the auger has a dextrorsal convolution and to discharge to the pick-up 8, the auger is rotated in a direction causing the forward crop-engaging side of the auger to sweep upwardly. This consequently tends to lift the crop off the ground so that as it moves laterally it does not drag as heavily on the ground. The upward sweep of the forward side of the auger also holds the auger downwardly into the crop.

Inasmuch as the auger merely shifts the crop laterally without tumbling or fluffing, the aggregate sweepings of the auger will remain in relatively the same position as when scattered with the crop in the field, that is, the crop will remain on top of the dirt and stones and the like even when it is bunched in front of the tined pick-up 8. Thus, an ideal presentation of the sweepings to the pick-up 8 is obtained in that the tines thereof which are spaced above the ground and sweep upwardly merely rake the crop off the dirt and trash.

The tamper plate cooperates with the auger to maintain the crop delivered to in front of the pick-up 8 compacted whereby a maximum amount of crop is handled with a relatively small crop-receiving structure.

We claim:

1. In a tractor-mounted harvesting machine for gathering cut crops in the field and having a crop-receiving structure with an inlet at the forward end thereof, charging means therefor carried by the structure at said inlet, said charging means comprising a revolvable tined drum rotating with its forward side sweeping upwardly, said drum being spaced above and open to the ground whereby it effects a raking action on the crop and permits stones and dirt clods and the like to pass therebeneath, crop-gathering means disposed laterally outboardly of said inlet and comprising an auger rotatably carried by the structure above the ground and adapted to directly engage cut crop on the ground thereahead for shifting the crop along the ground to in front of said charging means without substantial fluffing of the crop, and a guide surface member carried by said structure and extending forwardly of said inlet along the inboard side thereof and transversely aligned with said auger and adapted to hold the bunched crop in front of said charging means.

2. In a crop-gathering apparatus for a harvester adapted to be moved over the ground to gather cut crops therefrom and including a support structure with a crop-receiving housing, a pick-up carried by housing at the front end thereof and arranged to discharge thereinto and comprising a rotated structure including a plurality of fingers sweeping upwardly on the forward side of the pick-up and stationary stripper bars carried by the housing and interdigitated with the fingers, an auger disposed outboardly of the pick-up and arranged generally parallel therewith and disposed longitudinally angularly with respect to the direction of movement of the harvester and connected to said structure, said auger being positioned immediately over the ground for engaging the crop on the ground thereahead, said auger having a discharge end directed toward and terminating at the path of travel of the pick-up.

3. In a crop harvester adapted to be moved over the ground to gather windrowed crops therefrom and having a crop-receiving structure with a mouth at its forward side, side delivery conveying means supported from the structure and disposed transversely relative to the line of travel for shifting the crops laterally on the ground to said mouth, intake means carried by the structure at said mouth and feeding therefrom and from the ground, said intake means sweeping upwardly on its leading side, and a floating tamper plate forming the roof of the mouth and extending laterally over said side delivery conveying means for yieldingly holding the crop compacted to said intake means and on the ground in front thereof.

4. A device for picking up cut hay and the like material in the field comprising a field traversing support, crop receiving means carried thereby and having an inlet at its forward end, a ground sweeping pick-up carried by said means at its inlet and operable to charge said means through said inlet, an auxiliary gatherer at one side of said pick-up and comprising a driven auger positioned angularly to the line of draft of the device and having its discharge end positioned in the path of the pick-up, draft means on the support carrying the auger in direct sweeping relationship to the ground, the auger being adapted to be moved with its forward side directly into the material lying on the ground thereahead and functioning to shift the material laterally without substantial fluffing to said pick-up whereby the material is delivered to said pick-up in a compacted bunch.

5. In a machine for harvesting cut field crops and including a field traversing support carrying a crop-receiving structure, the improvement comprising a wide-swath gatherer including a plurality of laterally stepped components, one of said components carried by the forward end of the crop-receiving structure and comprising a driven drum having a plurality of tines positioned to pass directly over the ground and rake the crop on the ground thereahead into said crop-receiving structure, and the other of said components comprising a driven auger carried by the support and positioned transversely of the line of draft of the machine with its discharge end in the path of said drum, said auger having flighting disposed to directly engage the crop on the ground thereahead as it lies on the ground and sweep the same laterally in a compacted bunch to in front of said drum substantially without fluffing or tumbling the same and to sweep the ground in front thereof substantially clean by presenting a continuous ground sweeping surface whereby delivering all of the sweeping to said drum, said drum having its tines functioning with a raking action to separate the crop from the aggregate sweepings delivered thereto by said auger.

6. In a device for harvesting cut crops from a field, a support structure, side delivery gathering means carried by said structure and comprising an auger extending transversely of the device and positioned adjacent to the ground in direct sweeping relationship thereto and adapted to be advanced with its forward side directly into the cut crop thereahead and discharge from one end, means for supporting the auger from its opposite end and including an assembly comprising a ground engaging runner, a tube extending along the rear side of the auger between the assembly and said support structure and connected at one end to said structure, driving means for the auger operatively connected to said opposite end of the auger and including a drive shaft through said tube extending from the opposite end thereof and journalled to said assembly, said auger rotated to sweep upwardly with its forward side whereby the auger is constantly urged toward the ground while biting into the crop thereahead.

7. A side delivery device for laterally shifting cut forage crop in a field comprising a field traversing support, a driven auger positioned substantially perpendicular to the line of draft of the device, means supporting one end of the auger only from the ground, draft means connecting said one end of the auger with said support, said auger being open and unsupported at its opposite discharge end and having flighting positioned to sweep directly immediately above the ground and unobstructed on its forward side and movable directly into the crop lying on the ground thereahead, said auger rotatable to sweep upwardly on its forward side and operable to shift the crop into which it is moved principally laterally toward said discharge end without fluffing or tumbling and enveloping the crop with stones and dirt clods or the like.

8. In a forage harvester for harvesting cut crops in the field and having a field traversing support including a crop-receiving structure, a rake type rotatable pick-up carried by the structure at its front end and arranged to rake crops lying upon the ground thereahead into said crop-receiving structure, side delivery gathering means extending laterally of the pick-up and arranged to discharge thereto and comprising an auger extending axially transversely to the direction of traverse of said harvester, means supporting said auger off the ground from said support, said auger having flighting arranged to shift the crop towards said pick-up with said auger rotating to develop an upwardly sweeping attitude of its forward side whereby said crop is caused to be lifted somewhat to prevent its heavy dragging along the ground as it is moved towards said pick-up and said auger is held to the ground, said pick-up rotating in a direction sweeping upwardly on its forward side and effective to rake out the crop from the aggregate sweepings delivered thereto by the auger.

9. In a forage harvester for gathering cut crops in the field, a field traversing support including a crop-receiving structure, a rear-delivery pick-up at the forward end of the structure sweeping upwardly with its forward side, a side delivery pick-up disposed laterally and forwardly of said rear-delivery pick-up and comprising an auger positioned to rotate with its forward side upwardly directly above the ground and adapted to be moved with its forward side into the crop lying upon the ground thereahead, said auger having its discharge end positioned at said rear-delivery pick-up and adapted to shift the crop in a compacted bunch as it lies on the ground to in front of said rear-delivery pick-up, an upright stop panel extending from said structure forwardly of said rear-delivery pick-up at the end thereof remote from said auger and transversely aligned with said auger, a tamper plate extending from above said rear-delivery pick-up forwardly thereof and from said panel toward said auger above said discharge end thereof, and spring-loaded means suspending said tamper plate from said support and urging it downwardly against the bunched crop in front of said rear-delivery pick-up for holding the crop in a compacted bunch against the upward sweeping action of said rear-delivery pick-up and discharge end of the auger.

RUSSELL R. RANEY.
EDWIN F. HUDDLE.

References Cited in the file of this patent

UNITED STATES PATENTS

| Number | Name | Date |
|---|---|---|
| 2,455,905 | Ronning et al. | Dec. 7, 1948 |
| 2,494,388 | Heth | Jan. 10, 1950 |
| 2,509,430 | Guy | May 30, 1950 |
| 2,519,005 | Thompson et al. | Aug. 15, 1950 |